Aug. 19, 1958     L. C. NOSCO     2,847,904

PROJECTOR MOUNTING MECHANISM

Filed March 15, 1957     4 Sheets-Sheet 1

Aug. 19, 1958   L. C. NOSCO   2,847,904
PROJECTOR MOUNTING MECHANISM
Filed March 15, 1957   4 Sheets-Sheet 3

Louis C. Nosco
INVENTOR.
BY
ATTORNEYS

Aug. 19, 1958 L. C. NOSCO 2,847,904
PROJECTOR MOUNTING MECHANISM
Filed March 15, 1957 4 Sheets-Sheet 4

Louis C. Nosco
INVENTOR.
BY Daniel I. Mayne
Steve W. Gremban
ATTORNEYS

United States Patent Office 2,847,904
Patented Aug. 19, 1958

2,847,904

PROJECTOR MOUNTING MECHANISM

Louis C. Nosco, Rochester, N. Y., assignor to Eastman Kodak Company, Rochester, N. Y., a corporation of New Jersey Application March 15, 1957, Serial No. 646,324

9 Claims. (Cl. 88—24)

This invention relates generally to projectors, and more specifically to a projector mounting mechanism adapted to selectively position the projector with the incident optic axis of the lens system disposed in either a horizontal or vertical plane.

Contour measuring projectors generally contain suitable apparatus for supporting an object or work piece that is to be contour examined, a light source for illuminating the objects, and a lens system provided with an objective lens for receiving light from the object and mirrors for directing the image formed by the objective lens onto a screen. When the applicant hereinafter refers to the incident optic axis of the lens system, it is to be understood that this defines the optic axis actually passing through the work piece, or into which the work piece transversely extends when it is being contour examined. With reference to the drawings, the incident optic axis is designated by the line A—A in Fig. 3.

The provision of contour measuring projectors in which the incident optic axis of the lens system is positioned in solely a horizontal or a vertical plane is generally old in the art. Certain types of machined parts or work pieces that are to be contour examined are more suitably adapted to one or the other type of projector. For example, small stampings and generally flat plate-like work pieces are better suited for contour viewing in a projector in which the incident optic axis of the lens system is vertically disposed. The parts can be conveniently laid upon a suitable transparent table transverse to and in register with the incident optic axis and held in a contour measuring position solely by the force of gravity acting on the part. If the same type of work piece is viewed in a projector having an incident optic axis lying in a horizontal plane, expensive jigs or fixtures have to be utilized to properly hold the parts in a contour measuring position. This is particularly so where the objects are of irregular shape and hence not well adapted to being laid in a fixed position upon a horizontally disposed table. Also, several operations are required to examine the entire contour of the part since the portion held in the fixture is obscured and hence cannot be examined. The present invention provides a projector mounting mechanism wherein the projector may be selectively positioned with the incident optic axis of the lens system lying either in a horizontal or a vertical plane depending upon the type of work piece to be viewed.

Therefore, one of the primary objects of this invention is to provide a contour measuring projector that may be selectively positioned with the incident optic axis of the lens system lying in either a horizontal or vertical plane.

A more specific object of the invention is the provision of a contour measuring projector mounted for rotation about an axis disposed at substantially 45° (degrees) with respect to the incident optic axis of the projector lens system and adapted to be selectively oscillated 180° between a first position with the incident optic axis lying in a horizontal plane, and a second position with the incident optic axis lying in a vertical plane.

Still another object of the invention is to provide a projector mounting mechanism adapted to selectively position and lock the projector with the incident optic axis of the lens system lying in either a horizontal or a vertical plane.

Objects and advantages other than those set forth above will be obtained from the following description when read in connection with the accompanying drawings, in which.

Figure 3:
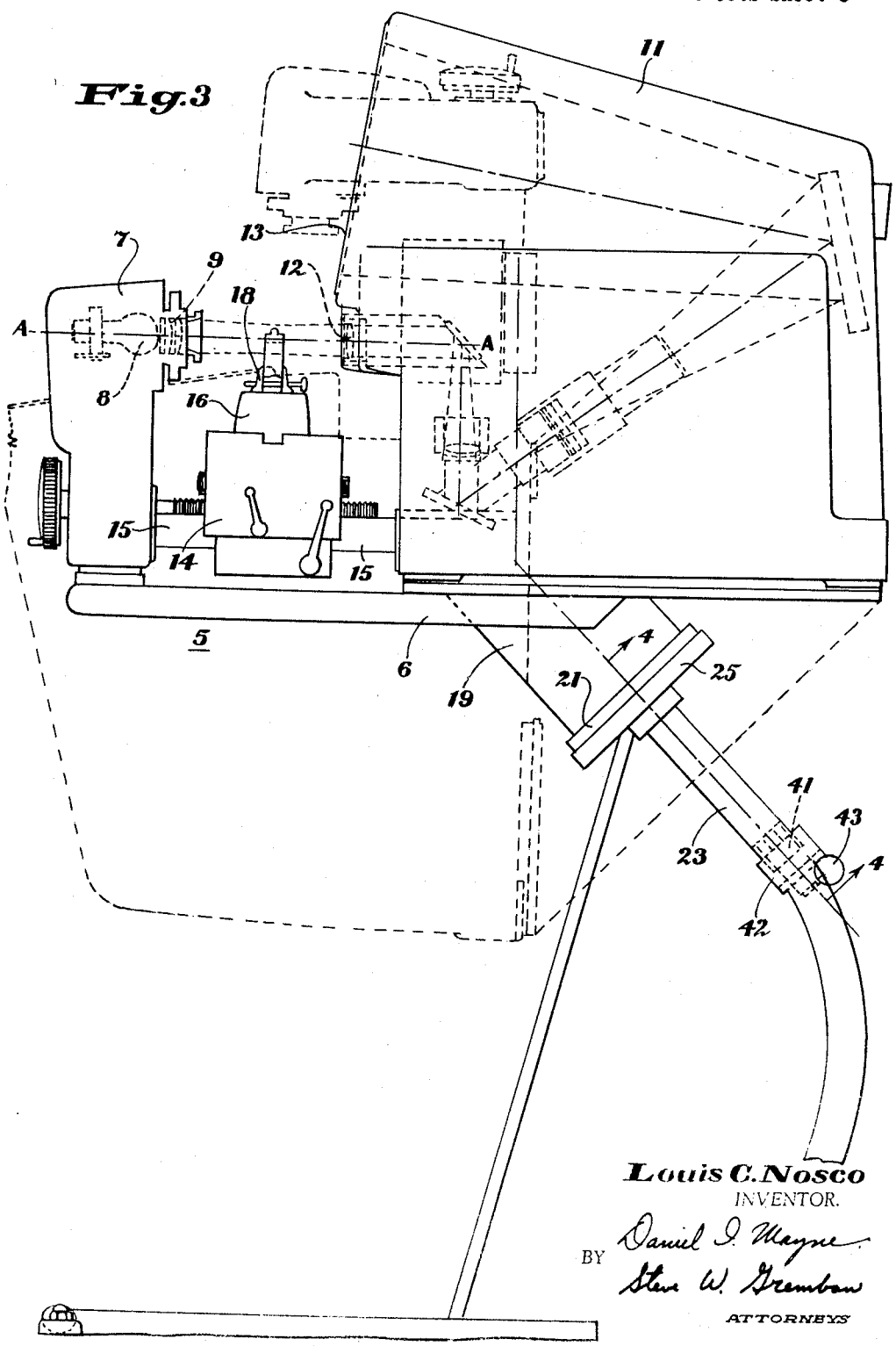
Fig. 3 is a fragmentary side elevation view of the projector and projector mounting mechanism showing in dotted lines the optic system and the position assumed by the projector when it is pivoted through an angle of 180°.

Referring to the drawings, the contour measuring projector 5 comprises essentially a base 6 having a casing 7 mounted at one end within which a light source 8 and condenser lens 9 are mounted as shown dotted in Fig. 3. A housing 11 is mounted on the opposite end of the base 6 and is provided with an objective lens 12 shown dotted in Fig. 3 in optical alignment with the condenser lens 9 and forming the incident optic axis of the projection system. Fastened within the housing 11 are a plurality of mirrors for directing an image formed by the objective lens 12 onto an image screen 13 mounted at an angle to the horizontal at the upper front portion of the housing 11. Interposed intermediate the housing 11 and the casing 7 is a saddle 14 mounted on a pair of ways 15 so that it is slidably movable longitudinally and in a direction transverse thereto by suitable cranks as is well known. A work holder 16 adapted to support a work piece which is to be contour measured is slidably mounted on the saddle for lateral movement and is provided with a locking means 17 to releasably lock the work holder 16 to the saddle 14. The work holder 16 is further provided with a vise 18 within which the work piece may be removably secured to extend transversely of the incident optic axis.

Figure 4:
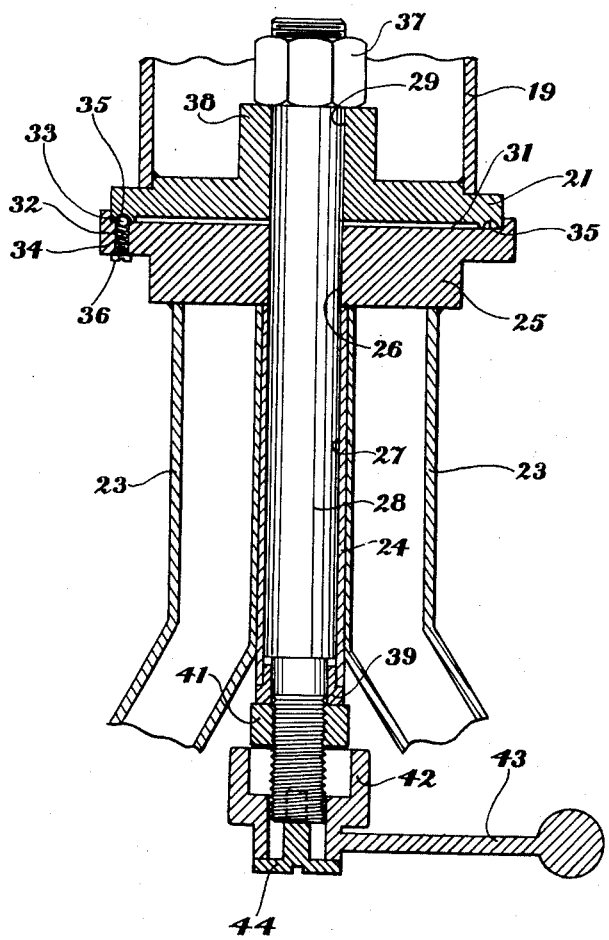
Fig. 4 is an enlarged section view taken along line 4—4 of Fig. 3.

The contour projector 5 of this invention consists essentially of a projector unit adapted to be rotatably movable with respect to a mobile support unit. The rotatable projector unit comprises the projector 5, a tubular element 19 as seen in Fig. 4 rigidly secured by welding or any other suitable means to the projector base 6 with its axis disposed at an angle of substantially 45° with respect to the incident optic axis of the projector lens system, and an annular member 21 secured to the end of the tubular element 19. The member 21 is provided with a central opening 29. The mobile support unit comprises a wheeled carriage 22 formed of tubular members 23, a cylindrical casing 24 secured to the carriage by welding, and an annular element 25 mounted on one end of the cylindrical casing 24 with an opening 26 therein in register with the casing opening 27 as seen in Fig. 4. The projector unit is mounted on the mobile support unit by seating the member 21 in a recess 31 formed by the element 25 and inserting a spindle 28 through the openings 26, 27, and 29. A nut 37 is threaded on one end of the spindle 28 and engages a boss 38 formed by the member 21. A sleeve 39 is slidably disposed on the opposite end of the spindle 28 and is adapted to bear on the end of the casing 24 upon turning a nut 41. The nut 41 is turned by a locking member to draw the element 25 and member 21 together into frictional engagement to effectively lock the projector unit to the mobile support unit. This locking member comprises a cup-shaped socket 42 conforming to the shape of the nut 41 and axially movable along the end of the spindle 28 into engagement therewith. The socket 42 is provided with a handle 43 to facilitate turning the socket 42 and the nut 41. A large headed cap screw 44 is screwed into a threaded bore formed by the end of the spindle 28 to retain the locking member on the spindle.

Figure 1:
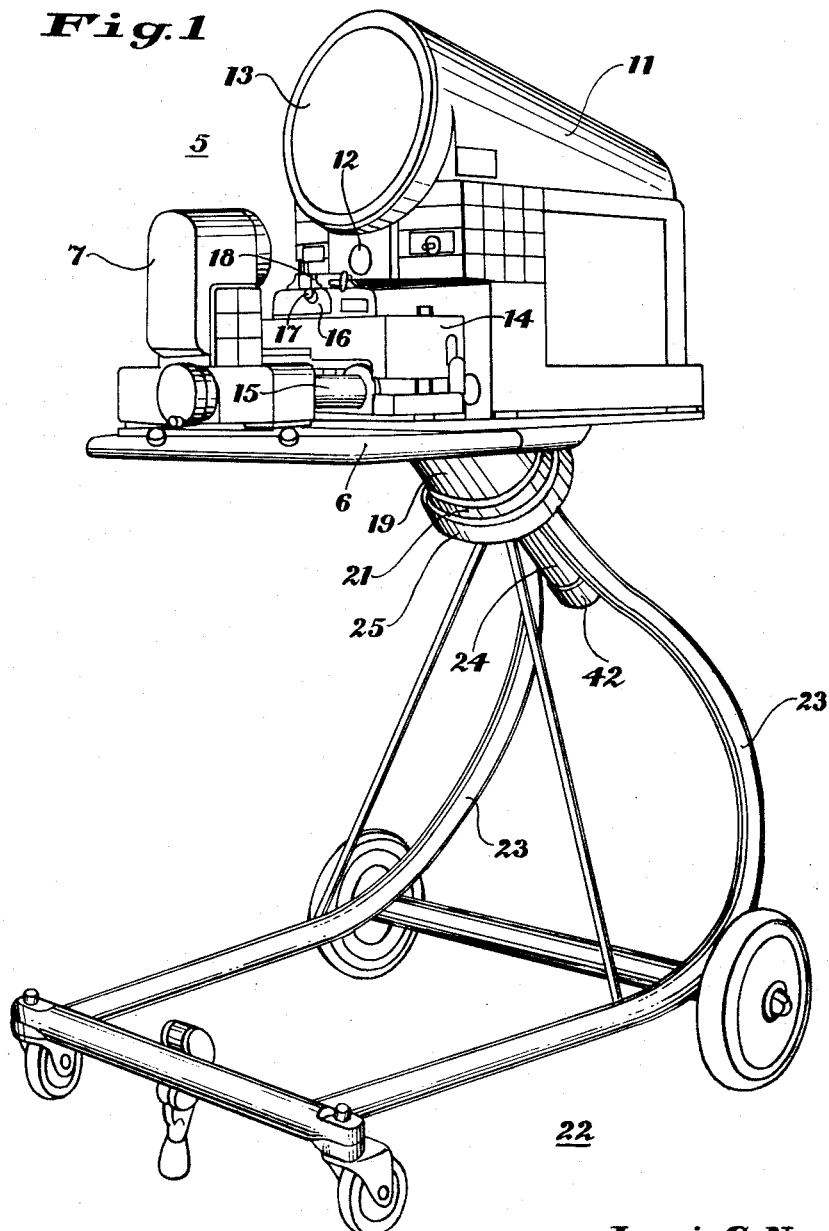
Fig. 1 is a perspective view of a contour measuring projector of this invention with the incident optic axis of the lens system lying in a horizontal plane.
Figure 2:
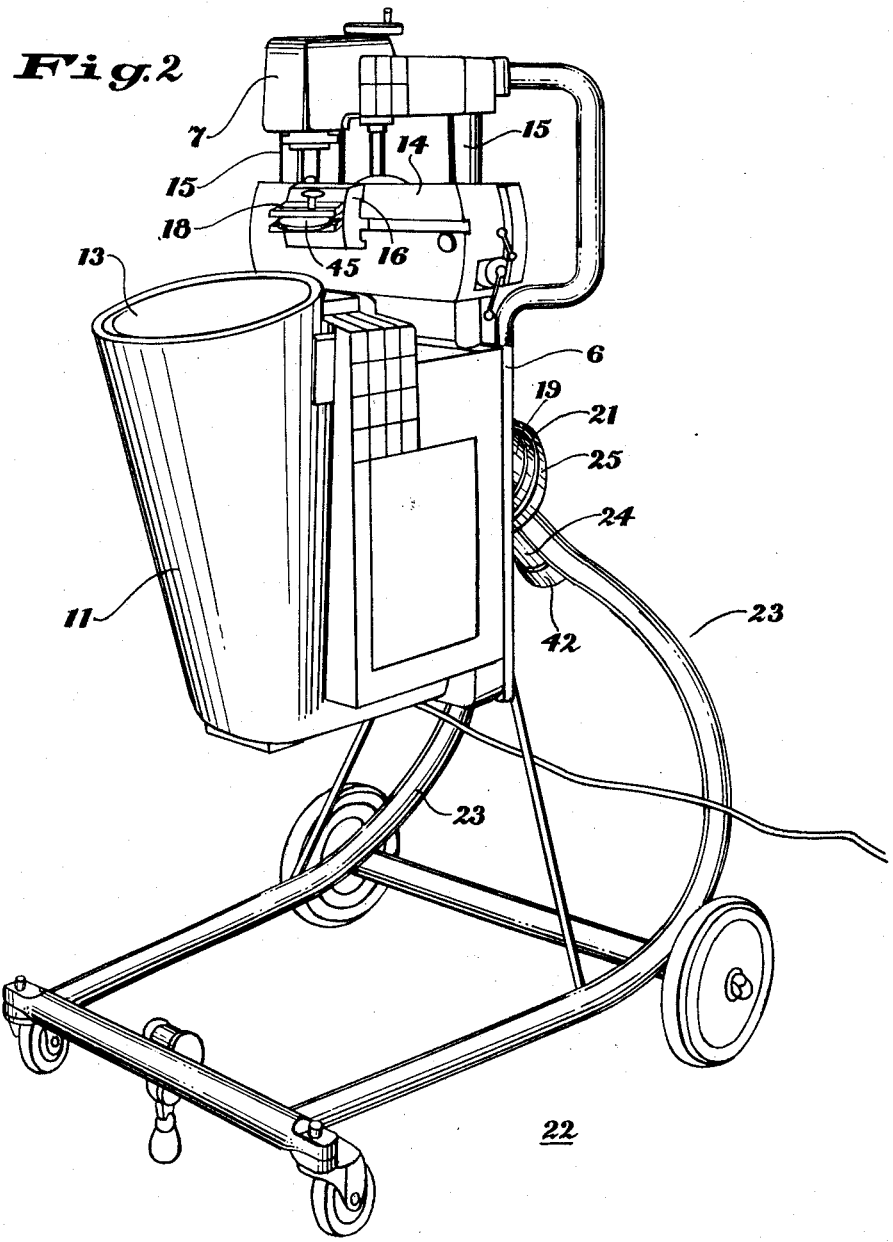
Fig. 2 is a view similar to Fig. 1 with the incident optic axis of the lens system lying in a vertical plane.

The member 21, casing 24 and element 25 are mounted to support the spindle 28 with its axis disposed at an angle of substantially 45° with respect to the incident optic axis of the projector lens system as best seen in Fig. 3. Consequently, rotating the projector unit with respect to the mobile support unit from one position in which the projector is disposed with the incident optic axis of the lens system lying in a horizontal plane 180° into another position disposes the projector 5 with the incident optic axis lying in a vertical plane. To assure proper positioning of the projector unit into one or the other position, a detent 32 is provided comprising a steel ball 33 disposed in an opening formed by the element 25 and urged by a spring 34 into engagement with one of two diametrically opposed recesses 35 formed by the member 21 as shown in Fig. 4. A cap screw 36 retains the steel ball 33 and spring 34 in the opening. In the operation of this invention, let us assume initially that the projector 5 is in the position as shown in Fig. 1 and that the operator has completed measuring the contour of work pieces of irregular shape and now desires to measure the contour of a large number of small, flat stampings. Since placing each of the stampings in the vise would obstruct a considerable portion of the stamping and would necessitate the removal of the stamping and reinsertion thereof in the vise in a different position in order to measure its entire contour, the operator eliminates all these additionally required motions by selectively positioning the projector 5 with the incident optic axis of the lens system lying in a vertical plane as seen in Figs. 2 and 3. To accomplish this, the operator merely moves the socket 42 axially into engagement with the nut 41, turns the handle 43 in a direction to unscrew the nut 41 and release the frictional force holding the movable unit to the support unit, rotates the projector 5 about the spindle 28 through an angle of 180° until the detent 32 engages the other recess 35 in which position the incident optic axis of the lens system lies in a vertical plane, and then moves the handle 43 in a locking position to effectively lock the projector 5 in the new position. A transparent blade 45 as seen in Fig. 2 is clamped in the vise 18 and the stampings are placed upon the plate 45 one at a time whereby the operator is able to view the entire contour of each of the stampings in one operation.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a movable unit housing said projector; a support unit; and pivot means carried by one of said units for pivotally connecting said movable unit to said support unit, said pivot means having an axis disposed at substantially 45° with respect to said incident optic axis whereby said projector may be selectively oscillated 180° between a first position with said incident optic axis lying in a horizontal plane and a second position with said incident optic axis lying in a vertical plane.

2. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a movable unit housing said projector, said movable unit forming a first opening; a support unit forming a second opening in register with said first opening; and pivot means comprising a spindle insertable through said first and second openings for pivotably connecting said movable unit to said support unit, said spindle having an axis disposed at substantially 45° with respect to said incident optic axis whereby said projector may be selectively oscillated 180° between a first position with said incident optic axis lying in a horizontal plane, and a second position with said incident optic axis lying in a vertical plane.

3. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a movable unit housing said projector; a support unit; a pivot means carried by one of said units for pivotally connecting said movable unit to said support unit, said pivot having an axis disposed at substantially 45° with respect to said incident optic axis whereby said projector may be selectively oscillated 180° between a first position with said incident optic axis lying in a horizontal plane, and a second position with said incident optic axis lying in a vertical plane; and lock means for locking said units together after said projector has been selectively disposed into one of said first and second positions.

4. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a movable unit housing said projector, said movable unit forming a first opening; a support unit forming a second opening in register with said first opening; a pivot means comprising a spindle insertable through said first and second openings for pivotally connecting said movable unit to said support unit, said spindle having an axis disposed at substantially 45° with respect to said incident optic axis whereby said projector may be selectively oscillated 180° between a first position with said incident optic axis lying in a horizontal plane, and a second position with said incident optic axis lying in a vertical plane; and lock means comprising a socket adapted to engage a nut threaded on one end of said spindle for urging said units into frictional engagement upon turning said socket to lock said units together after said projector has been selectively disposed into one of said first and second positions.

5. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a base for supporting said light source and lens system; a member having one end secured to the underside of said base and said opposite end forming an opening; a support element positioned in register with said member and forming an elongated opening in register with the opening in said member; a spindle insertable through said openings to provide a pivot about which said projector may be pivoted with respect to said support member, said spindle having an axis disposed at substantially 45° with respect to the incident optic axis of said lens system whereby said projector may be selectively oscillated 180° between a first position with said incident optic axis lying in a horizontal plane, and a second position with said optic axis lying in a vertical plane.

6. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a base for supporting said light source and lens system; a member having one end secured to the underside of said base and said opposite end forming an opening; a support element positioned in register with said member and forming an elongated opening in register with the opening in said member; a spindle insertable through said openings to provide a pivot about which said projector may be pivoted with respect to said support member, said spindle having an axis disposed at substantially 45° with respect to the incident optic axis of said lens system whereby said projector may be selectively oscillated 180° between a first position with said incident optic axis lying in a horizontal plane, and a second position with said incident optic axis lying in a vertical plane; and lock means adapted to urge said member into frictional engagement with said support element whereby said projector may be selectively locked in one of said first and second positions.

7. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a base for supporting said light source and lens system; a member having one end secured to the underside of said base; a first annular member secured to the opposite end of said member; a support element; a second annular member secured to said support element and positioned in register with said first member, said support element forming an elongated opening in register with the openings in said first and second annular members; a spindle insertable through said openings to provide a pivot about which said projector may be pivoted with respect to said support element, said spindle having an axis disposed at substantially 45° with respect to the incident optic axis of said lens system whereby said projector may be selectively oscillated 180° between a first position with said incident optic axis lying in a horizontal plane, and a second position with said incident optic axis lying in a vertical plane; and lock means adapted to urge said first member into frictional engagement with said second member whereby said projector may be selectively locked in one of said first and second positions.

8. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a base for supporting said light source and lens system; a member having one end secured to the underside of said base; a first annular member secured to the opposite end of said member; a support element; a second annular member secured to said support element and positioned in register with said first member, said support element forming an elongated opening in register with the openings in said first and second annular members; a spindle insertable through said openings to provide a pivot about which said projector may be pivoted with respect to said support element, said spindle having an axis disposed at substantially 45° with respect to the incident optic axis of said lens system whereby said projector may be selectively oscillated 180° between a first position with said incident optic axis lying in a horizontal plane, and a second position with said incident optic axis lying in a vertical plane; and lock means comprising a socket adapted to engage a nut threaded on one end of said spindle for axially urging said first member into frictional engagement with said second member upon turning said socket whereby said projector may be selectively locked in one of said first and second positions.

9. In a contour measuring projector having means for supporting an object, a light source for illuminating said object, a screen, and a lens system for forming an image of said object on said screen including an objective for receiving light from said object along an incident optic axis into which said object is adapted to transversely extend, the combination of: a base for supporting said light source and lens system; a tubular member having one end secured to the underside of said base; a first annular member secured to the opposite end of said tubular member; a support member; a second annular member secured to said support member and positioned in register with said first member, said support member forming an elongated opening in register with the openings in said first and second annular member; a spindle insertable through said openings to provide a pivot about which said projector may be pivoted with respect to said support member, said spindle having an axis disposed at substantially 45° with respect to the incident optic axis of said lens system whereby said projector may be selectively oscillated 180° between a first position with said incident optic axis lying in a horizontal plane, and a second position with said incident optic axis lying in a vertical plane; and lock means including a detent means for selectively holding said projector in one of said first and second positions and a socket adapted to engage a nut threaded on one end of said spindle for axially urging said first member into frictional engagement with said second member upon turning said socket whereby said projector may be selectively locked in one of said first and second positions.

No references cited.